United States Patent
Lord

[15] 3,684,378

[45] Aug. 15, 1972

[54] DARK CURRENT CORRECTION CIRCUIT FOR PHOTOSENSING DEVICES

[72] Inventor: Joseph S. Lord, 5 Chicatabut Dr., Walpole, Mass. 02081

[22] Filed: Sept. 4, 1970

[21] Appl. No.: 69,674

[52] U.S. Cl. ......................356/93, 250/232, 356/95, 356/97, 356/179, 356/205, 356/211, 356/217

[51] Int. Cl. ..............................................G01j 3/42

[58] Field of Search ............................356/93–95, 97, 356/179, 205, 211, 217; 250/226, 232, 233

[56] References Cited

UNITED STATES PATENTS 3,025,746 3/1962 Cary et al. ...................356/94

*Primary Examiner*—Ronald L. Wibert
*Assistant Examiner*—F. L. Evans
*Attorney*—Pennie, Edmonds, Morton, Taylor and Adams

[57] ABSTRACT

In a flicker-type photosensing device, photosensor dark current is corrected for by applying the output of the photosensor to a current-to-voltage mode amplifier including a special dark current correction loop. In particular, the amplifier has connected between its input and output terminals a loop including a resistor, a grounded capacitor, a gating arrangement adapted to close the loop only during those periods when no light beam is applied to the photosensor, and a second resistor for limiting the capacitor charging rate. In operation, the capacitor charges while the gate is closed during the dark period; and, during pulse periods when the gate is open, it discharges to reduce the photosensor current by an amount nearly equal to the dark current.

11 Claims, 3 Drawing Figures

INVENTOR
Joseph S. Lord
BY Pennie, Edmonds, Morton, Taylor & Adams
ATTORNEYS

INVENTOR
Joseph S. Lord
BY Pennie, Edmonds, Morton, Taylor & Adams
ATTORNEYS

DARK CURRENT CORRECTION CIRCUIT FOR PHOTOSENSING DEVICES

BACKGROUND OF THE INVENTION

The present invention relates to an improved dark current correction circuit which is particularly useful in photosensing devices such as spectrophotometers.

A wide variety of photosensing devices are used to compare the intensities of two or more beams of radiation by the so-called "flicker" method. For example, spectrophotometers are used to obtain the transmission coefficient of a sample of material by comparing the intensities of light beams of different frequency which have passed through the sample with the intensities of corresponding unattenuated reference beams. While in early devices the intensities of the two beams were compared by transmitting them to two separate photosensors and comparing the output currents, it soon became evident that error was introduced by the fact that two different photosensors nearly always have different characteristics. To overcome this problem, the flicker method was developed whereby a beam switching arrangement is provided for alternately applying the reference beam and the sample beam to the same photosensor. The beam intensities are then compared by electronically sorting the two series of current pulses and then comparing their amplitudes. In addition to permitting the development of accurate photometers, this flicker method has also proved useful in the development of highly accurate colorimeters and photometers.

One of the difficulties associated with photosensing devices of the flicker type is that of correcting for varying levels of dark current from the photosensor. For a variety of reasons, the dark current level tends to drift, thereby introducing errors in linearity when the currents produced by two separate beams are compared. While feedback arrangements can be used to correct for these errors (see U.S. Pat. No. 3,131,349 issued to H. H. Cary et al., Apr. 28, 1964 ), these arrangements are relatively complex and involve the use of an unnecessarily large number of circuit components.

SUMMARY OF THE INVENTION

In accordance with the present invention, dark current in a flicker-type photosensing device is corrected for by applying the output of radiation sensing element to a current-to-voltage mode amplifier including a special dark current correction loop. In particular, the amplifier has connected between its input and output terminals a loop including a resistor, a grounded capacitor, a gating arrangement to close the loop only during those periods when no light beam is applied to the sensing element, and a second resistor for limiting the capacitor charging rate. In operation, the capacitor charges while the gate is closed during the dark period; and, during pulse periods when the gate is open, it discharges to reduce the current from the sensing element by an amount very nearly equal to the dark current.

BRIEF DESCRIPTION OF THE DRAWINGS

The advantages, nature and various additional features of the invention will appear more fully upon consideration of the illustrative embodiment now to be described in detail in connection with the accompanying drawings.

In the drawings.

DETAILED DESCRIPTION

Figure 1:
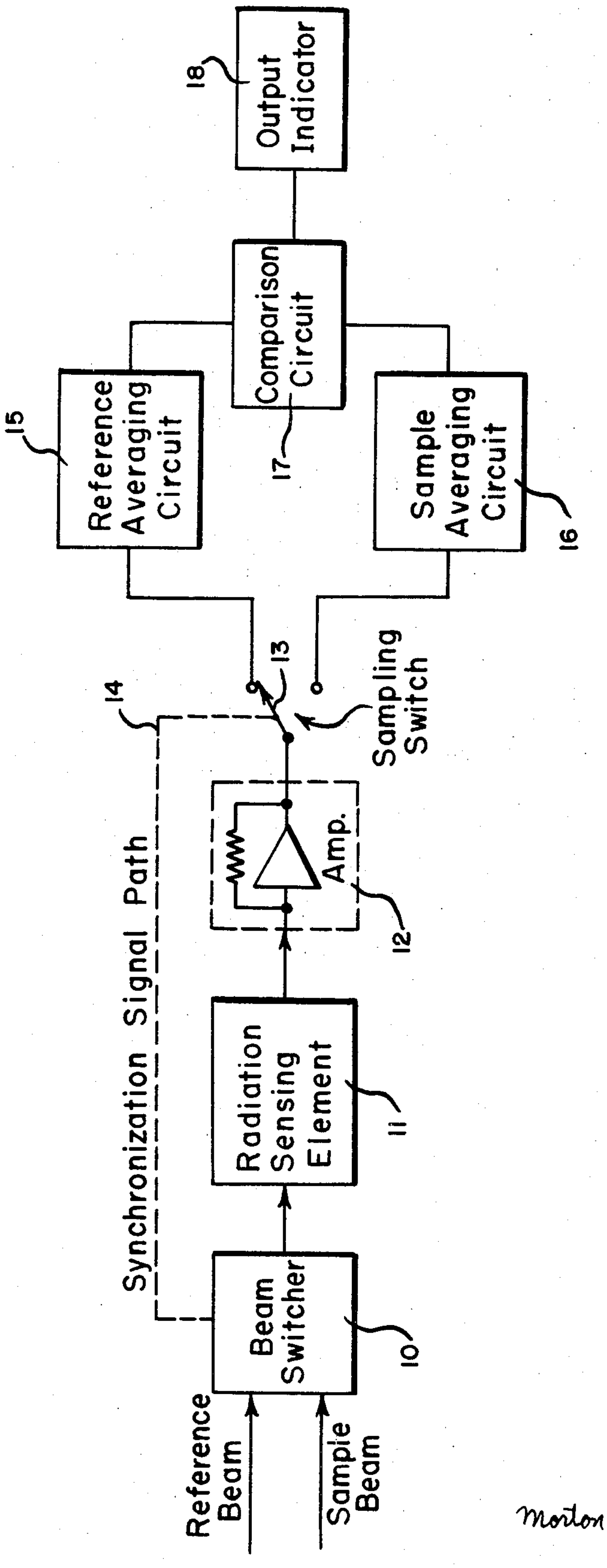
FIG. 1 is a schematic box diagram of a typical flicker-type photosensing device.

In reference to the drawings, the box diagram of FIG. 1 depicts a typical photosensing device comprising a beam switcher 10 (such as a shutter arrangement) for receiving two or more beams of radiation and alternately applying them to a radiation sensing element 11 (such as a photosensor) as two separate series of pulses. The sensing element, in turn, converts the two series of radiation pulses into corresponding series of current pulses which are converted to augmented voltage pulses by amplifier 12. The pulses are electronically sorted by sampling switch 13 in response to a synchronization signal over path 14 and applied to separate averaging circuits 15 and 16. The ratio of the outputs of the averaging circuits is determined in comparison circuit 17, and this ratio is shown on output indicator 18.

Figure 2:
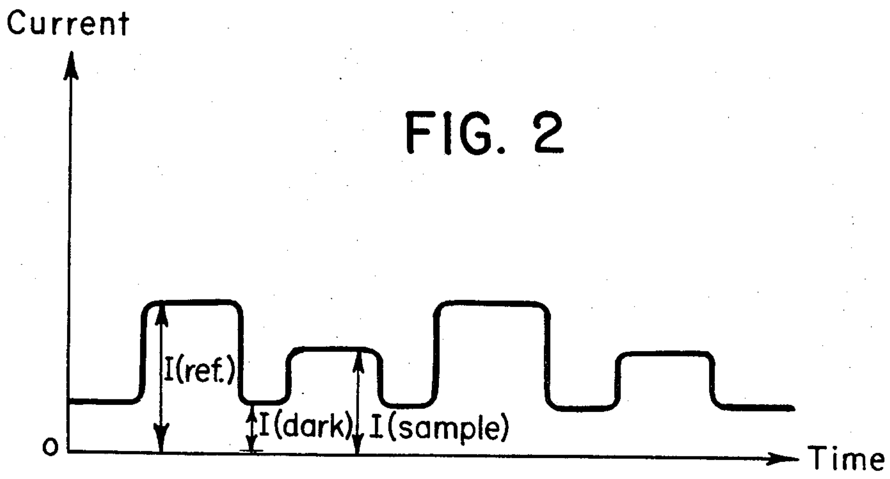
FIG. 2 is a graphical illustration showing the current output of a typical radiation sensing element in a device such as that shown in FIG. 1.

FIG. 2 is a qualitative graphical illustration of the output of element 11 under typical operating conditions. The output comprises, in essence, two separate series of current pulses: one series having an amplitude corresponding to the intensity of the reference beam and the other series having an amplitude corresponding to the intensity of the sample beam. Between successive pulses is a nonzero current level corresponding to the dark current of the photocell. This dark current level varies gradually with time; and, as a result of this variation, the amplitudes of the reference and sample pulses are incrementally increased or decreased. The dark current introduces nonlinearity in the output, and variation in the dark current level introduces error.

Figure 3:
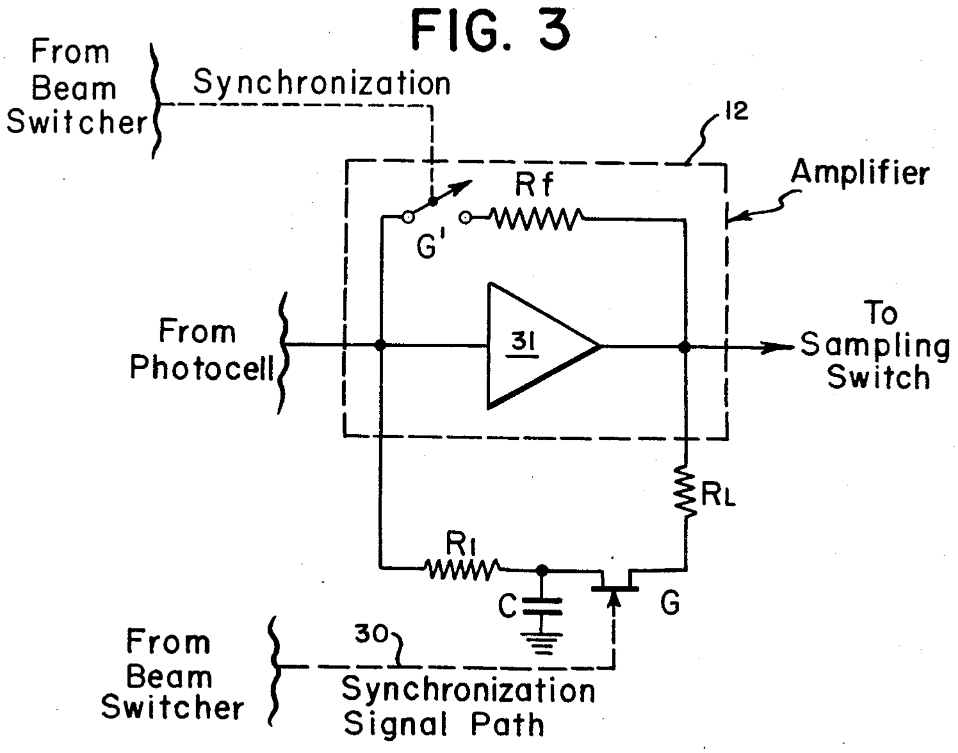
FIG. 3 is a circuit diagram showing a dark current correction circuit in accordance with the invention.

FIG. 3 is a circuit diagram showing dark current correction circuitry connected to the amplifier 12 shown in FIG. 1. In particular, connected between the input and the output of amplifier 12 is a gated circuit loop including, in combination: a resistor $R_1$, a grounded capacitor C, a gate G for closing the loop in response to synchronization signals from the beam switcher over path 30, and a load resistor $R_L$ for limiting the rate at which the capacitor is charged. In the usual case, amplifier 12 is a current-to-voltage mode amplifier comprising a differential input amplifier 31 (having its second input grounded or connected to a small offset voltage) which is connected in parallel with a resistor $R_f$. In this case, $R_1$ is chosen to be much smaller than $R_f$, and $R_L$ is chosen to be much smaller than $R_1$. C is chosen so that $R_1C$ is large compared to the duration of the longest light pulse used. Gate G can comprise a field effect transistor having its gate suitably connected to the synchronization pulse source in the beam switcher so that the transistor is conducting during the dark period and non-conducting at other times.

In operation, the loop is closed during the 1C) period between successive pulses. Since $R_1$ is much smaller than $R_f$, nearly all of the dark current $I_d$ will flow through the added loop, and since $R_1$ is much greater than $R_L$, nearly all the voltage drop will fall across $R_1$ and the capacitor. Thus, the capacitor will charge to a voltage $V_d = I_d R_1$. At the end of a dark period gate G opens, opening the loop and permitting C to discharge a current $I = I_d$ exp. $(-t/R_1$against the pulse current from the photocell. Since $R_1C$ is larger than the duration of a light pulse, the discharge current is constrained to approximate the dark current throughout the light pulse. Thus, the dark current is effectively canceled from the photocell. (In actual practice, the circuit was found to cancel more than 95 percent of the dark current.) In addition, variations in the dark current level are quickly compensated for by greater discharge currents.

The invention will become clearer and more concrete by reference to the following specific example. The radiation sensing element in a typical spectrophotometer is a photomultiplier having a dark current on the order of 1 $\mu$a; and the parallel resistance (of resistor $R_f$) in the amplifier is on the order of 500,000 ohms. A correction circuit with $R_1$ equal to 2,500 ohms, C equal to 500 microfarads and $R_L$, 50 ohms was found to cancel more than 95 percent of the dark current during normal operation at 30 cycles per second switching frequency.

While greater cancellation of the dark current is not usually necessary, it can be obtained by introducing a second gate G' to open the loop containing $R_F$ during the dark period so that no current will be shunted through $R_L$ when the capacitor is charging.

It is understood that the above described arrangements are merely illustrative of the many possible specific embodiments which can represent applications of the principles of the invention. Numerous and varied other arrangements can readily be devised by those skilled in the art without departing from the spirit and scope of the invention.

I claim:

1. A flicker-type photosensing device for comparing the intensities of two or more beams of radiation including a beam switcher for applying alternate pulses of different beams to a radiation sensing element, an amplifier for amplifying current generated by said element and circuitry for comparing the current generated by said beams, said device characterized by a gated loop between the input and the output of said amplifier, said loop comprising, in combination:

- a first resistor, $R_1$, for generating a charging voltage proportional to the current from the output of said radiation sensing element when said gated loop is closed;
- a grounded capacitor having a capacitance C for charging in response to said charging voltage generated by said resistor $R_1$ when said gated loop is closed and for discharging correction current through said resistor $R_1$ against current from the output of said radiation sensing element when said gated loop is open;
- a gate arrangement responsive to synchronization pulses from said beam switcher for closing said loop only during the dark period when no beams are directed onto said radiation sensing element, thereby permitting said grounded capacitor to charge, and for opening said loop during the light period when a light beam is applied to said radiation sensing element, thereby permitting said capacitor to discharge; and
- a second resistor, $R_L$, for limiting the rate at which the capacitor is charged when said loop is closed.

2. A device according to claim 1 wherein the resistance of said first resistor $R_1$ is large compared to that of said second resistor$R_L$.

3. A device according to claim 1 wherein the product $R_1C$ of the resistance of said first resistor and the capacitance of said capacitor is large compared to the period of the longest radiation pulse.

4. A device according to claim 1 wherein:

- said amplifier is a current-to-voltage mode amplifier;
- said first resistor $R_1$ is large compared to said second resistor; and
- the product $R_1C$ of the resistance of said first resistor and the capacitance of said capacitor is large compared to the period of the longest radiation pulse.

5. A device according to claim 4 wherein the gate arrangement comprises a field effect transistor.

6. A device according to claim 4 wherein said current-to-voltage mode amplifier comprises an amplifier connected in parallel with a third resistor $R_f$.

7. A device according to claim 6 wherein the resistance of said third resistor $R_f$ is large compared to that of said first resistor.

8. A device according to claim 7 wherein said radiation sensing element is a photosensor.

9. A device according to claim 7 including a second gating arrangement for removing said third resistor, $R_f$, from the operating circuit during only the dark periods when no beams are directed onto said radiation sensitive cell.

10. A flicker-type photosensing device for comparing the intensities of two or more beams of radiation including a beam switcher for applying alternate pulses of different beams to a radiation sensing element, an amplifier for amplifying current generated by said element and circuitry for comparing the current generated by said beams, said device characterized by a gated loop between the input and the output of said amplifier, said loop comprising, in combination:

- a gate arrangement responsive to synchronization pulses from said beam switcher for opening said loop during the light period when one of said two or more beams is applied to said radiation sensing element and for closing said loop during the dark period when none of said beams are applied to said sensing element, thereby permitting the passage of dark current through said loop;
- a first resistive means, $R_1$, for generating a charging voltage upon the passage of dark current through said loop;
- capacitive means C for charging in response to said charging voltage generated by said resistor $R_1$ when said gate is closed and for discharging through said resistor, $R_1$, when said gate is open;
- a second resistive means, $R_L$, for limiting the rate at which the capacitor C is charged when said loop is closed;
- wherein the values of $R_1$, C, and $R_L$ are chosen so that the current produced by the discharge of the capacitor is substantially equal to the dark current.

11. The device according to claim 1 wherein $R_1$ is small compared to $R_1$ and C is chosen so that $R_1C$ is large compared with the duration of the longest light pulse used in said photosensing device.

* * * * *